United States Patent [19]

Mudge

[11] Patent Number: 4,692,366

[45] Date of Patent: Sep. 8, 1987

[54] FLOCKING ADHESIVES BASED ON EVA-MALEATE COPOLYMERS

[75] Inventor: Paul R. Mudge, Somerville, N.J.

[73] Assignee: National Starch and Chemical Corporation, Bridgewater, N.J.

[21] Appl. No.: 905,352

[22] Filed: Sep. 8, 1986

[51] Int. Cl.$^4$ .................... B05D 1/14; B05D 1/16; B32B 3/02; B32B 33/00

[52] U.S. Cl. .................................... 428/90; 427/206; 427/385.5; 428/95; 428/97; 526/304; 526/318; 526/324

[58] Field of Search .................. 427/206, 385.5, 389, 427/389.9; 428/288, 290, 90, 95, 97; 526/304, 318, 324

[56] References Cited

U.S. PATENT DOCUMENTS

| | | | |
|---|---|---|---|
| 2,965,617 | 12/1960 | MacDonald et al. | 526/318 X |
| 3,337,482 | 8/1967 | Watanabe et al. | 260/8 |
| 3,345,318 | 10/1967 | Lindemann et al. | 260/29.6 |
| 3,483,171 | 12/1969 | Kuhlkamp et al. | 526/318 X |
| 3,501,440 | 3/1970 | Kamio et al. | 526/324 X |
| 3,639,326 | 2/1972 | Kray et al. | 526/324 X |
| 3,657,174 | 4/1972 | Glabisch et al. | 526/318 X |
| 3,755,237 | 8/1973 | Isaacs et al. | 526/324 X |
| 3,823,108 | 7/1974 | Bissot et al. | 526/318 X |
| 3,923,752 | 12/1975 | Guse et al. | 526/318 X |
| 3,933,691 | 1/1976 | Lindemann | 428/304 X |
| 4,001,158 | 1/1977 | Lindemann | 260/29.6 TA |
| 4,044,197 | 8/1977 | Wiest et al. | 526/304 |
| 4,322,516 | 3/1982 | Wiest et al. | 428/355 X |
| 4,446,274 | 5/1984 | Okazaki et al. | 524/812 |
| 4,510,274 | 4/1985 | Okazaki et al. | 523/411 |
| 4,542,182 | 9/1983 | Schuppiser et al. | 524/377 X |

FOREIGN PATENT DOCUMENTS

| | | | |
|---|---|---|---|
| 1123879 | 8/1968 | United Kingdom | 526/324 |
| 1188635 | 4/1970 | United Kingdom | 526/324 |

OTHER PUBLICATIONS

CA96(22)184028b; Chemical Abstract; Sanyo Chemical Industries, Ltd., Patent Application JP 56/167791, "Low-Temperature Flow Improvers".

CA102(8):64744c; Chemical Abstract: Mitsubishi Electric Corp., Patent Application JP 59/138695, "Pour Point Depressants for Crude Petroleum".

"Producing Durable Flocked Goods", Vincent J. Moser and Arthur L. Allewelt; Resin Review, vol. XX, No. 3.

"Acrylic Adhesives for the Textile Flocking Industry", George C. Kantner and Frank X. Chancler; Resin Review, vol. XXXII, No. 2.

"Principles of Flocking", Ulrich Maag, Adhesives Age, Sep. 1975.

Primary Examiner—Michael R. Lusignan
Attorney, Agent, or Firm—Ellen T. Dec; Edwin M. Szala

[57] ABSTRACT

Flocking adhesives are prepared from an aqueous emulsion prepared by the emulsion polymerization of a vinyl ester of an alkanoic acid interpolymerized with: 10 to 30% by weight of ethylene; 15 to 40% by weight of a $C_4$–$C_{10}$ dialkyl maleate; 1 to 5% by weight of an N-methylol containing copolymerizable monomer; 0 to 4% by weight of an olefinically unsaturated carboxylic acid; and 0 to 1% by weight of a polyethylenically unsaturated comonomer.

18 Claims, No Drawings

FLOCKING ADHESIVES BASED ON EVA-MALEATE COPOLYMERS

The present invention is directed to the use in flocking adhesives of emulsion polymers comprising a vinyl ester of an alkanoic acid, ethylene, a $C_4$–$C_{10}$ dialkyl maleate and an N-methyol containing monomer.

Flocking is a process by which textile fibers are embedded into an adhesive on a substrate producing an article which normally has a velvet or suede-like hand or feel. The flocking process is carried out by passing a substrate, which has been coated or printed with a composition comprising the adhesive polymer, through an electrical field in which short fibers are electrostatically directed and oriented into the adhesive. In another technique, a beater bar orients and embeds the fibers by means of vibration. Still other techniques combine both the electrostatic field and a beater bar presumably yielding optimum flock orientation and density.

It is important in such applications that the resultant flocked products have a soft hand and drape as well as good durability properties: properties primarily controlled by the choice of the flocking adhesive. It is also important, in some applications, that the adhesive system have resistance to laundering, atmospheric oxidation and ultraviolet and heat degradation appropriate to the intended end use.

Heretofore, N-methylol containing comonomers have been polymerized into acrylate based latices for flocking where a soft hand or feel is the most important criteria, however these acrylate based flocking adhesives are relatively high in cost. N-methylolacrylamide-ethylene/vinyl acetate-based flocking adhesives are more economical and yield the necessary strength properties but are deficient in softness for some applications requiring extreme softness.

It is therefore an object of the present invention to provide a flocking adhesive based on ethylene vinyl ester copolymer emulsions which is characterized by an optimum balance of softness and strength.

SUMMARY OF THE INVENTION

We have now found that flocking adhesives may be prepared utilizing an aqueous emulsion prepared by the emulsion polymerization of a vinyl ester of an alkanoic acid interpolymerized with:
(a) 10 to 30% by weight of ethylene;
(b) 15 to 40% by weight of a $C_4$–$C_{10}$ dialkyl maleate;
(c) 1 to 5% by weight of an N-methylol containing copolymerizable monomer;
(d) 0 to 4% by weight of an olefinicaly-unsaturated carboxylic acid containing 3 to 6 carbon atoms; and
(e) 0 to 1% by weight of a polyethylenically unsaturated comonomer;
the total of the aforementioned comonomers equalling 100% by weight.

The resultant emulsions are combined with suitable thickeners and pigments and optical foaming agents. Fabrics prepared with these flocking adhesives possess superior durability properties as well as the desirable softness characteristic of those containing high acrylate content yet at a substantially reduced cost.

DESCRIPTION OF THE PREFERRED EMBODIMENTS

The vinyl esters utilized herein are the esters of alkanoic acids having from one to about 13 carbon atoms. Typical examples include: vinyl formate, vinyl acetate, vinyl propionate, vinyl butyrate, vinyl isobutyrate, vinyl valerate, vinyl 2-ethyl-hexanoate, vinyl isooctanoate, vinyl nonoate, vinyl decanoate, vinyl pivalate, vinyl versatate, etc. Of the foregoing, vinyl acetate is the preferred monomer because of its ready availability and low cost.

The N-methylol component is generally N-methylol acrylamide although other mono-olefinically unsaturated compounds containing an N-methylol group and capable of copolymerizing with ethylene and the vinyl ester may also be employed. Such other compounds include, for example, N-methylol methacrylamide or lower alkanol ethers thereof, or mixtures thereof. Adequate durability may be obtained using levels of the N-methylol comonomer as low as about 1 or 1.5% by weight so long as the wet properties of the flocked surface are not critical. In cases where exposure to water or moisture may be substantial, higher levels in the range of about 2.5% of more are required.

The dialkyl maleate monomers used herein include the $C_4$ and $C_{10}$ dialkyl maleates such as di-2-ethylhexyl maleate, di-n-octyl maleate, di-iso-octyl maleate, dimethylamyl maleate, di-butyl maleate and di-isodecyl maleate. Particularly preferred are the $C_6$–$C_{10}$ dialkyl maleates and more particularly, the $C_8$ dialkyl maleates. Due to its commercial availability, di-2-ethyhexyl maleate is most generally used. Since, after polymerization, the structure of the fumarate and maleate (cis and trans isomers) are the same, the corresponding fumarate esters are also contemplated for use herein. While amounts of the dialkyl maleate in excess of about 15% are beneficial, levels of at least about 20% are preferred.

The olefinically-unsaturated carboxylic acids which may optionally be present are the alkenoic acids having from 3 to 6 carbon atoms or the alkenedioic acids having from 4 to 6 carbon atoms, like acrylic acid, methacrylic acid, crotonic acid, itaconic acid, maleic acid or fumaric acid, or mixtures thereof in amounts sufficient to provide up to about 4% by weight, of monomer units in the final copolymer.

Optionally, polyunsaturated copolymerizable monomers may also be present in small amounts, i.e., up to about 1% by weight. Such comonomers would include those polyolefinically-unsaturated monomers copolymerizable with vinyl acetate and ethylene, for example, vinyl crotonate, allyl acrylate, allyl methacrylate, diallyl maleate, divinyl adipate, diallyl adipate, diallyl phthalate, ethylene glycol diacrylate, ethylene glycol dimethacrylate, butanediol dimethacrylate, methylene bis-acrylamide, triallyl cyanurate, etc. In addition, certain copolymerizable monomers which assist in the stability of the copolymer emulsion, e.g., acrylamide and vinyl sulfonic acid, are also useful herein as latex stabilizer. These optionally present monomers, if employed, are added in very low amounts of from 0.1 to about 2% by weight of the monomer mixture.

Conventional batch, semi-batch or continuous emulsion polymerization procedures may be utilized herein. Generally, the monomers are polymerized in an aqueous medium under pressures not exceeding 100 atmospheres in the presence of a catalyst and at least one emulsifying agent.

The quantity of ethylene entering into the copolymer is influenced by the pressure, the agitation, and the viscosity of the polymerization medium. Thus, to increase the ethylene content of the copolymer, higher pressures are employed. A pressure of at least about 10 atmospheres is most suitably employed. The mixture is thoroughly agitated to dissolve the ethylene, agitation being continued until substantial equilibrium is achieved. This generally requires about 15 minutes; however, less time may be required depending upon the vessel, the efficiency of agitation, the specific system, and the like.

Suitable as polymerization catalysts are the water-soluble free-radical-formers generally used in emulsion polymerization, such as hydrogen peroxide, sodium persulfate, potassium persulfate and ammonium persulfate, as well as tert-butyl hydroperoxide, in amounts of between 0.01 and 3% by weight, preferably 0.01 and 1% by weight based on the total amount of the emulsion. They can be used alone or together with reducing agents such as sodium formaldehyde-sulfoxylate, iron-II-salts, sodium dithionite, sodium hydrogen sulfite, sodium sulfite, sodium thiosulfate, as redox catalysts in amounts of 0.01 to 3% by weight, preferably 0.01 to 1% by weight, based on the total amount of the emulsion. The free-radical-formers can be charged in the aqueous emulsifier solution or be added during the polymerization in doses.

The polymerization is carried out at a pH of between 2 and 7, preferably between 3 and 5. In order to maintain the pH range, it may be useful to work in the presence of customary buffer systems, for example, in the presence of alkali metal acetates, alkali metal carbonates, alkali metal phosphates. Polymerization regulators, like mercaptans, aldehydes, chloroform, methylene chloride and trichloroethylene, can also be added in some cases.

The dispersing agents are all the emulsifiers generally used in emulsion polymerization, as well as optionally present protective colloids. It is also possible to use emulsifiers alone or in mixtures with protective colloids.

The emulsifiers can be anionic, cationic or nonionic surface active compounds. Suitable anionic emulsifiers are, for example, allkyl sulfonates, alkylaryl sulfonates, alkyl sulfates, sulfates of hydroxylalkanols, alkyl and alkylaryl disulfonates, sulfonated fatty acids, sulfates and phosphates of polyethoxylated alkanols and alkyphenols, as well as esters of sulfosuccinic acid. Suitable cationic emulsifiers are, for example, alkyl quaternary ammonium salts, and alkyl quaternary phosphonium salts. Examples of suitable non-ionic emulsifiers are the addition products of 5 to 50 mols of ethylene oxide adducted to straight-chained and branch-chained alkanols with 6 to 22 carbon atoms, or alkylphenols, or higher fatty acids, or higher fatty acid amides, or primary and secondary higher alkyl amines; as well as block copolymers of propylene oxide with ethylene oxide and mixtures thereof. When combinations of emulsifying agents are used, it is advantageous to use a relatively hydrophobic emulsifying agent in combination with a relatively hydrophilic agent. The amount of emulsifying agent is generally from about 1 to 10, preferably from about 2 to about 8, weight percent of the monomers used in the polymerization.

The emulsifier used in the polymerization can also be added in its entirety to the initial charge to the polymerization zone or a portion of the emulsifier, e.g., from 25 to 90 percent thereof, can be added continuously or intermittently during polymerization.

Various protective colloids may also be used in place of or in addition to the emulsifiers described above. Suitable colloids include partially acetylated polyvinyl alcohol, e.g., up to 50 percent acetylated, casein, hydroxyethyl starch, carboxymethyl cellulose, gum arabic, and the like, as known in the art of synthetic emulsion polymer technology. In general, these colloids are used at levels of 0.05 to 4% by weight based on the total emulsion.

The polymerization reaction is generally continued until the residual vinyl acetate monomer content is below about 1%. The completed reaction product is then allowed to cool to about room temperature, while sealed from the atmosphere.

The emulsions are produced and used at relatively high solids contents, e.g., between 35 to 70%, preferably not less than 50%, although they may be diluted with water if desired.

The particle size of the latex can be regulated by the quantity of nonionic or anonic emulsifying agent or protective colloid employed. To obtain smaller particles sizes, greater amounts of emulsifying agents are used. As a general rule, the greater the amount of the emulsifying agent employed, the smaller the average particle size.

The copolymers according to the invention have a glass transition temperature of between $-45°$ to $-20°$ C. and dry to form soft flexible films. They are generally crosslinked in a weakly acid pH range or in the presence of latent acid catalysts at elevated temperature. The optimum crosslinking temperatures are between 100° and 200° C., preferably between 130° and 160° C. Acid catalysts accelerate the crosslinking. Such acid catalysts are mineral acids or organic acids, such as phosphoric acid, tartaric acid, citric acid, or acid salts, such as chromium -III salts, aluminum chloride, ammonium chloride, zinc nitrate or magnesium chloride.

The resultant emulsion polymers are then formulated using conventional components and techniques to produce the flocking adhesives of the present invention. Thus, the copolymers are compounded, if necessary, with sufficient thickeners to provide a viscosity within the range of about 10,000 to 30,000 cps.; they are adjusted (generally with ammonium hydroxide) to a pH of 7 to 10, preferably 7.5 to 8.5, and any optional foaming agents added thereto.

The thickeners useful herein are these conventionally employed in the art and include, for example, hydroxyethylcellulose, carboxymethylcellulose, various classes of polyacrylate-hydrolyzed acrylonitriles as well as the carboxylic acid/acrylate emulsions or solutions. Typical of such thickeners are Acrysol ASE-60 or ASE-95 from Rohm and Haas, Carbopol from B. F. Goodrich, Natrosol 250HR from Hercules, Paragum 500 or 501 from Parachem Southern, etc. These thickeners are generally present in the amounts of 1 to 5% by weight based on the adhesive solids.

The foaming agents which may be used herein are generally the water soluble salts of aliphatic carboxylic acids containing 16 to 20 carbon atoms, preferably those of the 18 carbon atom acids, representative of which are the alkali metal, ammonium or amine salts of stearic acid, tallow fatty acids and oleic acid. Most commonly employed is ammonium stearate. The foaming agents, if used, are present in amounts of 1 to 10%, preferably 2 to 8%, by weight of the adhesive solids.

Other additives including auxiliary foaming agents, foam stabilizers, ultraviolet absorbers, pigments, catalysts, fire retardants and the like may also be present in these foamable adhesives in amounts conventional in the art. In particular, since acid catalysts accelerate the crosslinking, a suitable catalyst for the N-methylol components is generally employed. Such acid catalysts are mineral acids or organic acids including latent acid catalysts, such as phosphoric acid, tartaric acid, citric acid, or acid salts, such as chromium-III salts, aluminum chloride, ammonium chloride, zinc nitrate or magnesium chloride, as known in the art. The amount of catalyst is generally about 0.5 to 2% of the total emulsion polymer solids.

Virtually any surfaces typically subjected to flocking may be flocked using the present adhesives. Typical surfaces or substrates include woven and non-woven fabrics or scrims, paper, urethane foams, rubbers, fiberboard, fiberglass, polyethylene or polypropylene films and the like.

The choice of the fibers which can be applied by means of the adhesives of the invention is not critical. Thus, the flocked fibers may be flocked obtained from cotton linters, wood pulp, rayon, polyamides, polyacrylics, polyesters, polyacetates, triacetates, polyolefins, glass fibers, wool, asbestos, etc. Staple fibers having an average length of from about 0.2 mm to about 2 mm are preferably used. Cut or milled flocks can be used with the length of the milled flocks varying from about 0.2 mm to 1 mm and those of the cut flock from 0.3 to 5 mm. If desired they can be colored or pigmented before application.

When required for use, the formulated flocking adhesive may be foamed using equipment readily available for foaming compositions. This is accomplished by beating air or another gas into the latex composition until a fine, uniform cell structure foam is obtained having the desired foam cell size and body. The volume of the latex composition is increased from about 2 to 10 times its original volume by the foaming or frothing process, preferably from 2 to 4 times its original volume. The resultant foamed adhesive is then applied to the substrate using any conventional means, e.g. knife coater. Alternatively, the adhesive may be thickened, but not foamed, and applied directly to the substrate using knife coating or other conventional techniques.

After application of the latex to the base material, the flocking material is applied to the surface of the foam coating and the composite is then dried at an ambient to elevated temperature. The drying step is carried out for a period of time and at a temperature sufficient to dry the applied latex. These will vary depending upon the particular latex employed and the amount thereof applied to the base material. The latex can be air-dried at ambient temperature conditions. However, drying can be over a period of from about 1 to 5 minutes at from about 125° to 175° C.

As to the amount of the flock adhesive used, it has been found that the amount of adhesive per square yard may vary from 0.5 to 3.0 ounces and the thickness of the adhesive coating from 0.010 to 0.050 inch in the wet state. There is a direct relationship between the amount of flock fiber which may be attached and the amount of adhesive employed. However, since it is contemplated that a rather broad range of flock lengths and quality may be used, the amount of adhesive and the thickness of the coating may well be extended under certain conditions depending on the type of fiber employed.

Several optional steps may be included in the process. For example, the flock itself may be treated with a suitable flame-retardant reagent. Additionally artistic and ornamental effects may be obtained by various techniques. For instance, by applying the adhesive in an ornamental pattern, flock will adhere to the areas constituting the pattern. Colored adhesives can be used to create further effects thereby varying the ornamental appearance of the product.

The following examples are given to illustrate the present invention, but it will be understood that they are intended to be illustrative only and not limitative of the invention. In the examples, all parts are by weight unless otherwise indicated.

EXAMPLE 1

To a 10 liter autoclave was charged 675 g. (of a 20% w/w solution in water) sodium akyl aryl polyethylene oxide sulphate (3 moles ethylene oxide), 50 g. (of a 70% w/w solution in water) alkyl aryl polyethylene oxide (30 moles ethylene oxide), 60 g. (of a 25% w/w solution in water) sodium vinyl sulphonate, 0.5 g. sodium acetate, 2 g. sodium formaldehyde sulphoxylate, 5 g. (of a 1% w/w solution in water) ferrour sulphate solution and 1900 g. water. After purging with nitrogen, 2250 g. vinyl acetate and 750 g. di-2-ethylhexy maleate were charged to the reactor. The reactor was then pressurized to 750 psi with ethylene and equilibrated at 50° C. for 15 minutes. The polymerization was then started by metering in a solution of 60 g. tertiary butyl hydroperoxide in 290 g. water and 45 g. sodium formaldehyde sulphoxylate and 2 g. sodium acetate in 225 g. water over a period of 5 hrs. uniformly. Also added over 4 hours was a solution of 150 g. of N-methylol acrylamide (48% solution in water) and 75 g. of acrylic acid in a total of 250 g. of water.

Once the addition of the initiators was started, the reaction temperature was raised to 80°-82° C. and kept at this temperature until the reaction was completed. At the end of the initiator slow additions, the product was transferred to an evacuated vessel (30 liter) to remove residual ethylene from the system. It was identified as Emulsion 1.

Using the general reduced described above, additional emulsions were prepared varying the amounts and/or monomeric compositions. The major monomers and their respective amounts by weight are shown in Table I.

TABLE I

| Emulsion No. | VA | DEHM | DBM | E | NMA | AA |
|---|---|---|---|---|---|---|
| 1 | 60 | 20 | — | 20 | 2 | 2 |
| 2 | 50 | 30 | — | 20 | 2 | 2 |
| 3 | 62.5 | — | 17.5 | 20 | 3 | — |
| 4 | 0 | — | 40 | 20 | 3 | — |

Monomer Key:
VA = Vinyl Acetate
E = Ethylene
DEHM = Di-2-Ethylhexylmaleate
NMA = N—Methylol Acrylamide
DBM = Di-n-butyl Maleate
AA = Acrylic Aid Emulsions 1-4 were then used to prepare formable flocking adhesives which were subjected to the tests described below. The emulsion copolymers were compounded into adhesives using the following formula:

| Ingredients | Parts by Weight |
|---|---|
| Latex (@ 50% solids) | 70.3 |
| Clay Slurry (64% solids) | 22.4 |
| Froth Aids | 1.6 |
| Catalyst (20% solution) | 1.6 |
| Cellulosic Thickener | 0.6-3.2 |

-continued

| Ingredients | Parts by Weight |
|---|---|
| Water | 1.9 |

The following test procedures were utilized in evaluating the binders prepared herein:

Coating Parameters

Flock: Nylon
Substrate: Polyester
Foam: 1:1 ratio of Air to Compound
Wet Coating Thickness: 15 mils
Flocking Application: Electrostatic
Flock Time: 30 seconds
Drying Conditions: 5 minutes at 120° C.
Curing Conditions: 5 minutes at 155° C.

The following test procedures were utilized in evaluating the binders prepared herein:

TESTING METHODS

Dry Abrasion Resistance:

This test measures the durability of flocked fabrics to abrasive or rubbing type actions. A Tabor Abrasion Test was done using a CS-17 wheel for 1000, 2000 and 4000 cycles. Samples were rated on a scale of 0 to 5.0 with 0 equal to complete flock loss and 5.0 equal to no flock loss. A rating of at least about 3.0 is considered average/satisfactory with a rating of 4.0 preferred.

Wet Abrasion Resistance:

This test measures the durability of wet flocked fabrics to abrasive or rubbing type actions. In particular, this test would simulate the type of abrasion that would be experienced in a home laundering. A Tabor Abrasion Tester was utilized with Wheel #CS-17 for 500, 1000 and 2000 cycles. Samples were rated similar to the method used for Dry Abrasion Resistance. Samples were prepared by soaking them in water and then passing them through nip rollers @20 psi to insure consistent moisture level. Wet abrasion values of at least about 4.0 at 500 to 1000 cycles are preferred for end uses where exposure to moisture may be encountered.

Hand:

The purpose of this test is to determine the hand feel of each sample in terms of softness. Samples were compared to each other and ranked in order of softness, with 5.0 being the softest. Rating is subjective using a panel of 2 or 3 people. The softest hand possible is desired.

Pluck Strength:

The pluck strength test measures the amount of force required to remove bound fibers from the adhesive. A Kelly Clamp is used to secure several flock fibers which is then connected to a hand held scale for measuring the force required to remove bound fibers. Pluck strength values of 2.0 lbs are normally required, with values of at least about 2.5 to 3.0 being desired.

TABLE II

| TEST | Emulsion Number | | | | Controls | |
|---|---|---|---|---|---|---|
| | 1 | 2 | 3 | 4 | A | B |
| Dry Abrasion | | | | | | |
| 1000 cycles | 4.5 | 4.25 | 4.25 | 4.0 | 4.5 | 4.25 |
| 2000 cycles | 4.0 | 3.75 | 4.0 | 4.0 | 4.25 | 4.0 |
| 4000 cycles | 3.75 | 3.75 | 3.75 | 3.75 | 4.0 | 3.75 |
| Wet Abrasion | | | | | | |
| 500 cycles | 4.0 | 3.5 | 4.0 | 3.75 | 4.25 | 4.25 |
| 1000 cycles | 3.75 | 3.5 | 4.0 | 3.5 | 4.0 | 4.0 |
| 2000 cycles | 3.75 | 3.5 | 3.5 | 3.0 | 3.75 | 4.0 |
| Pluck Strength | 3.75 | 3.41 | 4.11 | 3.5 | 3.54 | 3.84 |
| Hand | 3.0 | 4.25 | 2.25 | 3.0 | 4.0 | 2.5 |

A Commercially used "soft" all-acrylic adhesive (Tg = −25° C.) (NMA = 3)
B Commercially used "hard" EVA adhesive (Tg = 12° C.) (NMA = 3; AA = 1)

The results of Table II show that a superior balance of strength (as observed in Control B) and softness (as observed in Control A) can be achieved using the flocking adhesives of the present invention. Thus, samples 2 and 4 containing higher levels of the maleate are acceptable for flocking applications where softness is the prime consideration, but exhibit lower wet abrasion when compared to the controls, while samples containing lower levels of maleate give strength values comparable to or greater than the controls.

Similar results would be obtained using binders prepared with other maleates in the $C_4$–$C_{10}$ range such as as well as the corresponding fumarates.

It will be apparent that various changes and modifications may be made in the embodiments of the invention described above, without departing from the scope of the invention, as defined in the appended claims, and it is intended therefore, that all matter contained in the foregoing description shall be interpreted as illustrative only and not as limitative of the invention.

We claim:

1. A flocking adhesive composition characterized by an excellent balance of softness and strength, comprising sufficient thickener selected from the group consisting of hydroxyethylcellulose, carboxymethylcellulose, polyacrylate-hydrolyzed acrylonitrile and carboxylic acid/acrylate emulsions or solutions to provide a viscosity of 10,000 to 30,000 cps., pigments, 0–10% by weight of the solids of a foaming agent comprising a water soluble salt of an aliphatic carboxylic acid containing 16 to 20 carbon atoms, and an aqueous emulsion, the latter prepared by the emulsion polymerization of a copolymer consisting essentially of:
    (a) a vinyl ester of an alkanoic acid having 1 to 13 atoms interpolymerized with the following comonomers:
    (b) 10 to 30% by weight of ethylene;
    (c) 15 to 40% by weight of a $C_4$–$C_{10}$ dialkyl maleate or the corresponding fumarate;
    (d) 1 to 5% by weight of N-methylol acrylamide or N-methylol methacrylamide;
    (e) 0 to 4% by weight of an olefinically unsaturated carboxylic acid having 3 to 6 atoms; and
    (f) 0 to 1% by weight of a polyethylenically unsaturated comonomer; the vinyl ester being added in an amount to total 100%.

2. The adhesive of claim 1 wherein the vinyl ester in the emulsion is vinyl acetate.

3. The adhesive of claim 1 wherein the N-methylol containing comonomer in the emulsion is N-methylol acrylamide or N-methylol methacrylamide.

4. The adhesive of claim 1 wherein the dialkyl maleate in the emulsion is present in an amount greater than 20% by weight.

5. The adhesive of claim 1 wherein the dialkyl maleate in the emulsion is a $C_6$–$C_{10}$ dialkyl maleate.

6. The adhesive in claim 5 wherein the dialkyl maleate in the emulsion is a $C_8$ dialkyl maleate.

7. The adhesive of claim 6 wherein the dialkyl maleate in the emulsion is di-2-ethylhexyl maleate.

8. The adhesive of claim 1 wherein the olefinically unsaturated carboxylic acid in the emulsion is selected from the group consisting of acrylic acid, methacrylic acid, crotonic acid, itaconic acid, maleic acid and fumaric acid.

9. The adhesive of claim 1 wherein the polyunsaturated copolymerizable monomer is selected from the group consisting of vinyl crotonate, allyl acrylate, allyl methacrylate, diallyl maleate, divinyl adipate, diallyl adipate, diallyl phthalate, ethylene glycol diacrylate, ethylene glycol dimethacrylate, butanediol dimethacrylate, methylene bis-acrylamide and triallyl cyanurate.

10. The adhesive of claim 1 which additionally contains an acid catalyst in an amount of 0.5 to 2% by weight of the emulsion polymer solids.

11. The adhesive of claim 1 containing a foaming agent comprising 1 to 10% by weight of the adhesive solids of a water soluble salt of an aliphatic carboxylic acid containing 16 to 20 carbon atoms.

12. A process for manufacturing a flocked article which comprises the steps of:
(I) applying to the substrate to be flocked a composition comprising a flocking adhesive composition characterized by an excellent balance of softness and strength, comprising sufficient thickener selected from the group consisting of hydroxyethylcellulose, carboxymethylcellulose, polyacrylate-hydrolyzed acrylonitrile and carboxylic acid/acrylate emulsions or solutions to provide a viscosity of 10,000 to 30,000 cps., pigments, 0–10% by weight of the solids of a foaming agent comprising a water soluble salt of an aliphatic carboxylic acid containing 16 to 20 carbon atoms, and an aqueous emulsion, the latter prepared by the emulsion polymerization of a copolymer consisting essentially of:
(a) a vinyl ester of an alkanoic acid having 1 to 13 atoms interpolymerized with the following comonomers:
(b) 10 to 30% by weight of ethylene;
(c) 15 to 40% by weight of a $C_4$–$C_{10}$ dialkyl maleate or the corresponding fumarate;
(d) 1 to 5% by weight of N-methylol acrylamide or N-methylol methacrylamide;
(e) 0 to 4% by weight of an olefinicially unsaturated carboxylic acid having 3 to 6 atoms; and
(f) 0 to 1% by weight of a polyethylenically unsaturated comonomer; the vinyl ester being added in an amount to total 100%; said adhesive being applied in an amount of 0.5 to 3.0 ounces per square yard;
(II) applying the flocking fibers to the coated substrate; and
(III) drying the flocked substrate.

13. The process of claim 12 wherein a foaming agent comprising a water soluble salt of an aliphatic carboxylic acid containing 16 to 20 carbon atoms is present in an amount of 1 to 10% by weight of the adhesive solids.

14. The process of claim 12 wherein the vinyl ester is vinyl acetate and the N-methylol containing comonomer is N-methylol acrylamide or N-methylol methacrylamide.

15. The process of claim 12 wherein the dialkyl maleate in the emulsion is present in an amount greater than 20% by weight.

16. The process of claim 12 wherein the dialkyl maleate in the emulsion is a $C_6$–$C_{10}$ dialkyl maleate.

17. The process of claim 12 wherein the dialkyl maleate in the emulsion is a $C_8$ dialkyl maleate.

18. A flocked article formed by the process of claim 12.

* * * * *

UNITED STATES PATENT AND TRADEMARK OFFICE
CERTIFICATE OF CORRECTION

PATENT NO. : 4,692,366
DATED : September 8, 1986
INVENTOR(S) : Paul R. Mudge

It is certified that error appears in the above-identified patent and that said Letters Patent are hereby corrected as shown below:

Column 6, line 19 "ferrour" should be -- furous --.

Column 6, line 21 "ethylhexy" should be --ethylhexyl--.

Column 6, line 51 "O" under "VA" should be -- 40 --.

Column 6, line 58 "formable" should be --foamable --.

Column 8, under Table II, Tg of the "hard" EVA should be $-12°C$.

Signed and Sealed this

Twelfth Day of July, 1988

Attest:

DONALD J. QUIGG

Attesting Officer    Commissioner of Patents and Trademarks

UNITED STATES PATENT AND TRADEMARK OFFICE
CERTIFICATE OF CORRECTION

PATENT NO. : 4,692,366
DATED : September 8, 1987
INVENTOR(S) : Paul R. Mudge

It is certified that error appears in the above-identified patent and that said Letters Patent are hereby corrected as shown below:

Column 6, line 19 "ferrour" should be -- ferrous --.

Column 6, line 21 "ethylhexy" should be -- ethylhexyl --.

Column 6, line 51 "0" under "VA" should be -- 40 --.

Column 6, line 58 "formable" should be -- foamable --.

Column 8, under Table II, Tg of the "hard" EVA should be -12°C.

This Certificate supersedes Certificate of correction issued July 12, 1988.

Signed and Sealed this

First Day of November, 1988

Attest:

DONALD J. QUIGG

Attesting Officer

Commissioner of Patents and Trademarks